(12) United States Patent
Hara et al.

(10) Patent No.: US 10,873,285 B2
(45) Date of Patent: Dec. 22, 2020

(54) INVERTER DRIVE DEVICE AND ELECTRICALLY DRIVEN VEHICLE SYSTEM USING THE SAME

(71) Applicant: Hitachi Automotive Systems, Ltd., Hitachinaka (JP)

(72) Inventors: Takafumi Hara, Tokyo (JP); Toshiyuki Ajima, Tokyo (JP); Katsuhiro Hoshino, Hitachinaka (JP); Akihiro Ashida, Hitachinaka (JP); Kazuto Oyama, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/468,594

(22) PCT Filed: Nov. 10, 2017

(86) PCT No.: PCT/JP2017/040530
§ 371 (c)(1),
(2) Date: Jun. 11, 2019

(87) PCT Pub. No.: WO2018/123291
PCT Pub. Date: Jul. 5, 2018

(65) Prior Publication Data
US 2019/0334469 A1 Oct. 31, 2019

(30) Foreign Application Priority Data

Dec. 28, 2016 (JP) .................................. 2016-254647

(51) Int. Cl.
*H02P 27/08* (2006.01)
*H02P 29/40* (2016.01)
(Continued)

(52) U.S. Cl.
CPC ............ *H02P 27/08* (2013.01); *H02M 7/537* (2013.01); *H02P 6/08* (2013.01); *H02P 29/40* (2016.02)

(58) Field of Classification Search
CPC ............ H02P 27/04; H02P 27/08; H02M 1/44
See application file for complete search history.

(56) References Cited

U.S. PATENT DOCUMENTS 7,923,961 B2 * 4/2011 Takamatsu .............. B60L 50/50
318/811
8,847,542 B2 * 9/2014 Osugi ..................... H02P 27/08
318/807
(Continued)

FOREIGN PATENT DOCUMENTS

JP   2009-136125 A   6/2009
JP   2011-172303 A   9/2011
(Continued)

OTHER PUBLICATIONS

International Search Report (PCT/ISA/210) issued in PCT Application No. PCT/JP2017/040530 dated Jan. 9, 2018 with English translation (three (3) pages).
(Continued)

*Primary Examiner* — Rina I Duda
(74) *Attorney, Agent, or Firm* — Crowell & Moring LLP

(57) ABSTRACT

This is to reduce electromagnetic noise while reducing a calculation load of a microcomputer. An inverter drive device according to the present invention switches a first control mode, a second control mode, and a third control
(Continued)

mode on the basis of vehicle speed information in a motor control device that controls a power converter that drives a polyphase motor by a PWM pulse signal based on a carrier signal, the first control mode being for updating a command voltage signal to the power converter only on a ridge side or a trough side of the carrier signal, the second control mode being for updating a command voltage signal to the power converter both on a ridge side and a trough side of the carrier signal, and the third control mode being for updating a command voltage signal to the power converter only once of ridge-trough-ridge or trough-ridge-trough of the carrier signal.

4 Claims, 13 Drawing Sheets

(51) Int. Cl.
*H02M 7/537* (2006.01)
*H02P 6/08* (2016.01)

(56) References Cited

U.S. PATENT DOCUMENTS

| 2006/0239047 | A1 | 10/2006 | Yoshimura et al. |
| 2008/0298785 | A1* | 12/2008 | Patel ..................... H02P 27/08 |
| | | | 388/820 |
| 2013/0264974 | A1 | 10/2013 | Suzuki |
| 2016/0094163 | A1 | 3/2016 | Takahashi |

FOREIGN PATENT DOCUMENTS

| JP | 2014-23350 A | 2/2014 |
| WO | WO 2005/034327 A1 | 4/2005 |

OTHER PUBLICATIONS

Japanese-language Written Opinion (PCT/ISA/237) issued in PCT Application No. PCT/JP2017/040530 dated Jan. 9, 2018 (four (4) pages).
Extended European Search Report issued in European Application No. 17886063.1 dated Jun. 9, 2020 (nine (9) pages).

* cited by examiner

FIG. 12

| NOISE FACTOR | NOISE FREQUENCY | REMARKS (CONTROL METHOD AND THE LIKE) |
|---|---|---|
| MAGNETIC DESIGN OF MOTOR | $N \times f1$, $2N \times f1$ | - |
| HIGH-VOLTAGE HARMONIC WAVE CAUSED BY INVERTER | $fc \pm 3f1$, $2/3fc \pm 2f1$ | VOLTAGE UPDATE TIMING: $3/(2fc)$ |
| | $fc \pm 3f1$, $fc$ | VOLTAGE UPDATE TIMING: $1/fc$ |
| | $fc \pm 3f1$ | VOLTAGE UPDATE TIMING: $1/(2fc)$ |

INVERTER DRIVE DEVICE AND ELECTRICALLY DRIVEN VEHICLE SYSTEM USING THE SAME

TECHNICAL FIELD

The present invention relates to an inverter drive device, and more particularly to an inverter drive device used in an electrically driven vehicle system.

BACKGROUND ART

An inverter drive device, which performs pulse width modulation (PWM) control and drives a motor, converts a direct current power supply into an alternating current voltage having an arbitrary frequency to realize variable speed driving.

Since the PWM control compares a sinusoidal modulation signal with a carrier signal such as sawtooth wave or triangular wave to generate a pulse voltage, noise due to electromagnetic exciting force (hereinafter abbreviated as electromagnetic noise) caused by a frequency of the carrier wave occurs.

In particular, when a frequency f of the electromagnetic exciting force coincides with a frequency fm of natural vibration of a mechanism, resonance occurs and large electromagnetic noise is generated. PTL 1 describes a technique of causing the frequency fc of the carrier signal to coincide with the frequency fm of the natural vibration of the mechanism in order to reduce the electromagnetic noise due to resonance.

CITATION LIST

Patent Literature

PTL 1: JP 2011-172303 A

SUMMARY OF INVENTION

Technical Problem

In PTL 1, update timing of the sinusoidal modulation signal is set to twice of "ridge" and "trough" of the carrier signal of the triangular wave so that no electromagnetic noise due to the frequency fc of the carrier signal occurs (see FIG. 1).

However, if the voltage update timing is set to "ridge" and "trough" (hereinafter abbreviated as ridge-trough update), a three-phase voltage to be applied to an inverter needs to be updated at a frequency 2fc that is twice the carrier signal and a processing load of a microcomputer increases.

In the case of using the ridge-trough update, the frequency of the voltage update timing needs to be increased. Therefore, it is difficult to increase the frequency of the carrier signal of the inverter. In contrast, if the voltage update timing is set to only "ridge" (hereinafter abbreviated as ridge update), the three-phase voltage to be applied to the inverter can be updated at the frequency fc of the carrier signal and the processing load of a microcomputer decreases (see FIG. 2). Meanwhile, since the number of times of the voltage update timing is halved in the ridge update, a harmonic voltage other than a basic waveform voltage increases as a waveform of an output voltage becomes coarser than the ridge-trough update.

An object of the present invention is to reduce electromagnetic noise while reducing a calculation load of a microcomputer.

Solution to Problem

To solve the above-described problems, an inverter drive device according to the present invention switches a first control mode, a second control mode, and a third control mode on the basis of vehicle speed information in a motor control device that controls a power converter that drives a polyphase motor by a PWM pulse signal based on a carrier signal, the first control mode being for updating a command voltage signal to the power converter only on a ridge side or a trough side of the carrier signal, the second control mode being for updating a command voltage signal to the power converter both on a ridge side and a trough side of the carrier signal, and the third control mode being for updating a command voltage signal to the power converter only once of ridge-trough-ridge or trough-ridge-trough of the carrier signal.

Advantageous Effects of Invention

According to the present invention, electromagnetic noise can be reduced while a calculation load of a microcomputer is reduced.

BRIEF DESCRIPTION OF DRAWINGS

FIG. 12 is a table of frequencies of electromagnetic noise generated by the motor 2 and the inverter 3.

DESCRIPTION OF EMBODIMENTS

Hereinafter, a first embodiment of the present invention will be described with reference to the drawings.

Figure 1:
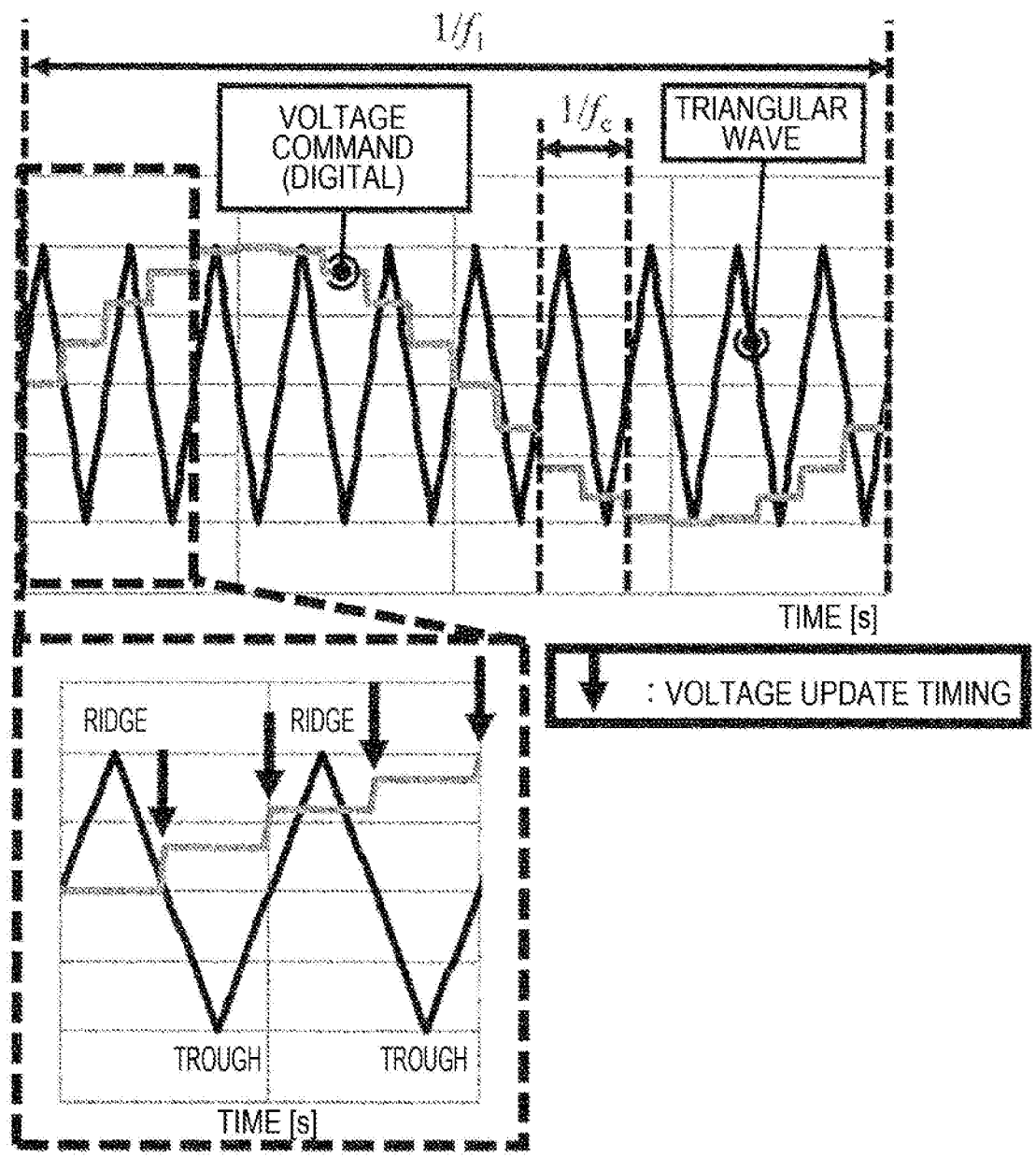
FIG. 1 is a diagram illustrating an example of when update timing of a modulation signal is set to ridge-trough.
Figure 2:
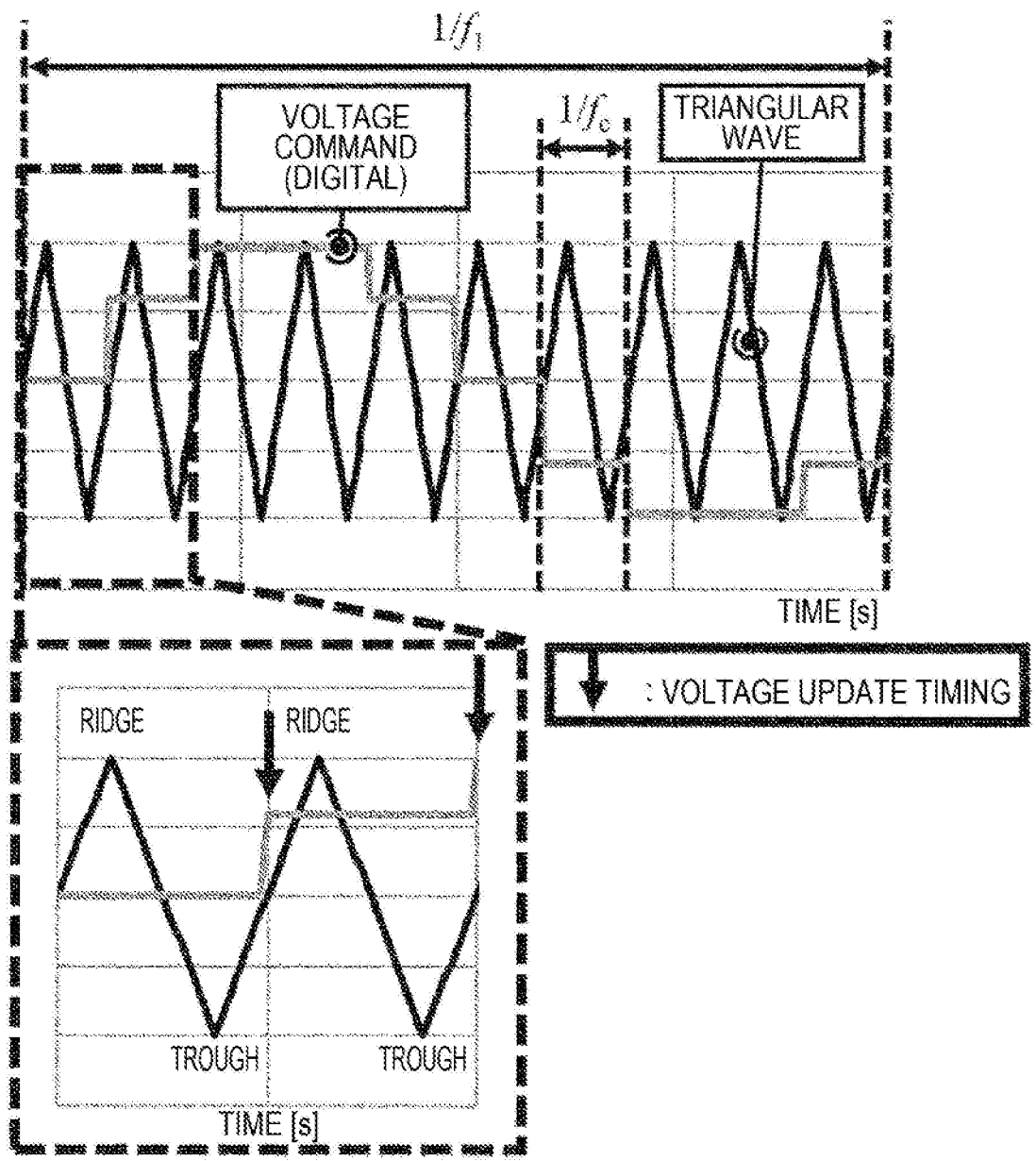
FIG. 2 is a diagram illustrating an example of when the update timing of the modulation signal is set to ridge.
Figure 3:
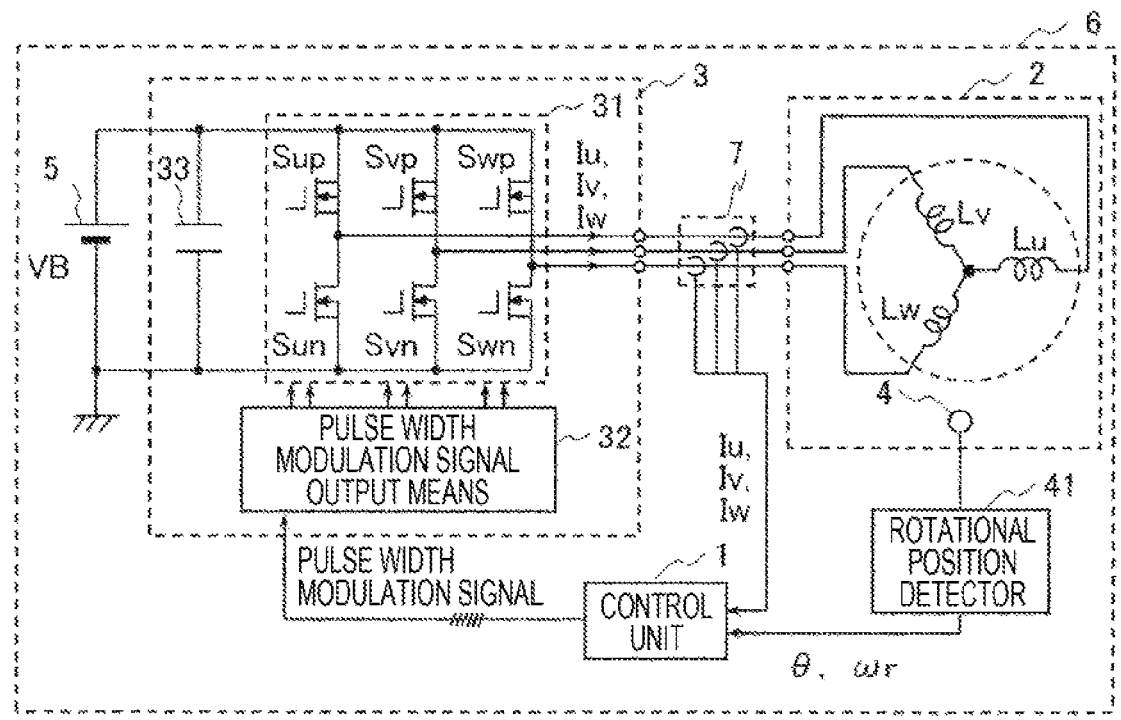
FIG. 3 is a block diagram illustrating a configuration of a motor drive apparatus including an inverter drive device according to the present embodiment.
Figure 4:
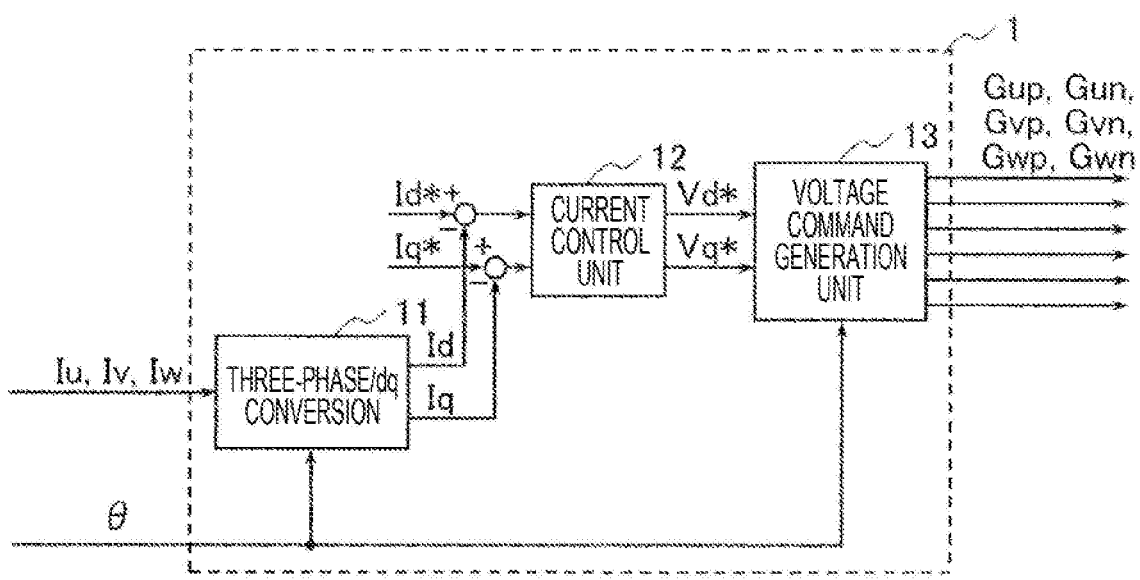
FIG. 4 is a block diagram of an inside of a control unit 1 illustrated in FIG. 3.

FIG. 3 is a block diagram illustrating a configuration of a motor drive apparatus 6 including an inverter drive device according to the present embodiment. FIG. 4 is a block diagram of an inside of a control unit 1 illustrated in FIG. 3.

The motor drive apparatus 6 includes a motor 2 and an inverter 3.

The inverter 3 includes an inverter circuit 31 that mutually converting a direct current into an alternating current, a pulse width modulation signal output means 32 that outputs a PWM signal to the inverter circuit 31, and a smoothing capacitor 33 that smooths direct current power.

A high-voltage battery 5 is a direct current voltage source of the motor drive apparatus 6. A direct current voltage VB of the high-voltage battery 5 is converted into a pulsed three-phase alternating current voltage having a variable voltage and a variable frequency by the inverter circuit 31 and the pulse width modulation signal output means 32 of the inverter 3 and applied to the motor 2.

The motor 2 is a synchronous motor rotationally driven by supplying the three-phase alternating current voltage. A rotational position sensor 4 is attached to the motor 2 in order to control a phase of an applied voltage of a three-phase alternating current according to a phase of an induced voltage of the motor 2, and a rotational position detector 41 calculates a rotational position 8 from an input signal of the rotational position sensor 4 and calculates a motor rotational speed ωr.

Here, as the rotational position sensor 4, a resolver constituted by an iron core and winding is favorable. However, a magnetic resistance element such as a GMR sensor or a sensor using a Hall element is also acceptable.

A current detection means 7 detects a U-phase alternating current Iu, a V-phase alternating current Iv and a W-phase alternating current Iw that are three-phase alternating currents flowing in the motor 2. Here, the current detection means 7 provided with three current detectors is illustrated. However, two current detectors are provided and a remaining one phase may be calculated according to a fact that a sum of three-phase currents is zero. Further, a pulsed direct current bus current flowing into the inverter 3 is detected as a voltage (current detection value Idc) between both ends of a shunt resistor Rsh inserted between the smoothing capacitor 33 and the inverter 3, and a direct current may be reproduced as a three-phase current according to the applied voltage.

As illustrated in FIG. 4, the control unit 1 includes a three-phase/dq conversion current control unit 11, a current control unit 12, and a voltage command generation unit 13, and drives the inverter circuit 31 of the inverter 3 according to the detected U-phase alternating current Iu, V-phase alternating current Iv, and W-phase alternating current Iw, and a d-axis current command Id* and a q-axis current command Iq* of the motor 2.

The three-phase/dq conversion current control unit 11 calculates dq-converted d-axis current value Id and q-axis current value Iq from the detected U-phase alternating current Iu, V-phase alternating current Iv, W-phase alternating current Iw, and rotational position 8. The current control unit 12 calculates a d-axis voltage command Vd* and a q-axis voltage command Vq* such that the d-axis current value Id and the q-axis current value Iq match the d-axis current command Id* and the q-axis current command Iq* created according to target torque.

The voltage command generation unit 13 calculates a U-phase voltage command value Vu*, a V-phase voltage command value Vv*, and a UW-phase voltage command value Vw* that are three-phase voltage command values UVW-converted from the d-axis voltage command Vd*, the q-axis voltage command Vq*, and the rotational position 8, and PWM-outputs a PWM pulse that is obtained by modulating a pulse width of the three-phase voltage command values. The PWM pulse controls ON/OFF of a semiconductor switch element of the inverter circuit 31 via a drive circuit to adjust an output voltage.

Note that, in a case of controlling a rotational speed of the motor 2 in the motor drive apparatus 6, the motor rotational speed ωr is calculated from time change in the rotational position 8, and a voltage command or a current command is created to coincide with a speed command from a host controller. Further, in a case of controlling motor output torque, the d-axis current command Id* and the q-axis current command Iq* are created using a relational expression or a map among the d-axis current value Id, the q-axis current value Iq, and motor torque.

Figure 5:
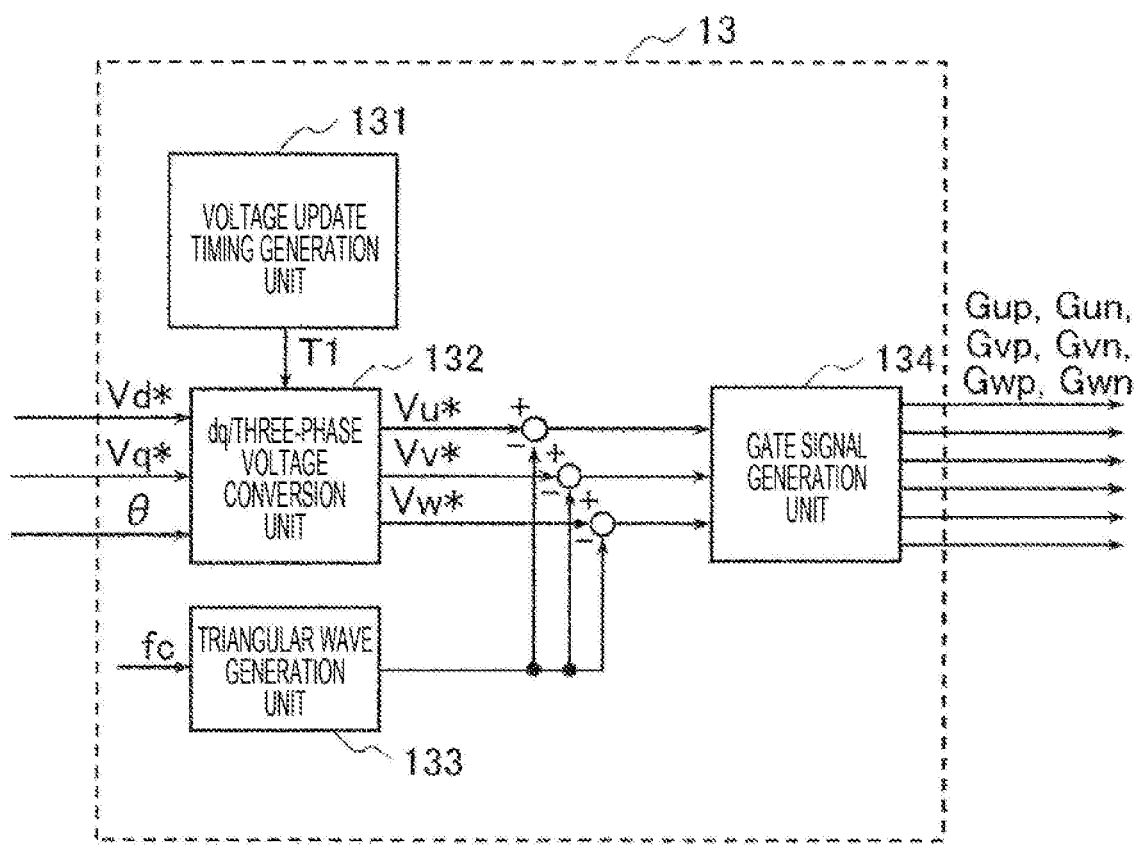
FIG. 5 is a block diagram of a voltage command generation unit 13.

Next, a voltage command generation unit 13 according to the present embodiment will be described with reference to FIG. 5. FIG. 5 is a block diagram of the voltage command generation unit 13. The voltage command generation unit 13 includes a voltage update timing generation unit 131, a dq/three-phase voltage command conversion unit 132, a triangular wave generation unit 133, and a gate signal generation unit 134.

Figure 6:
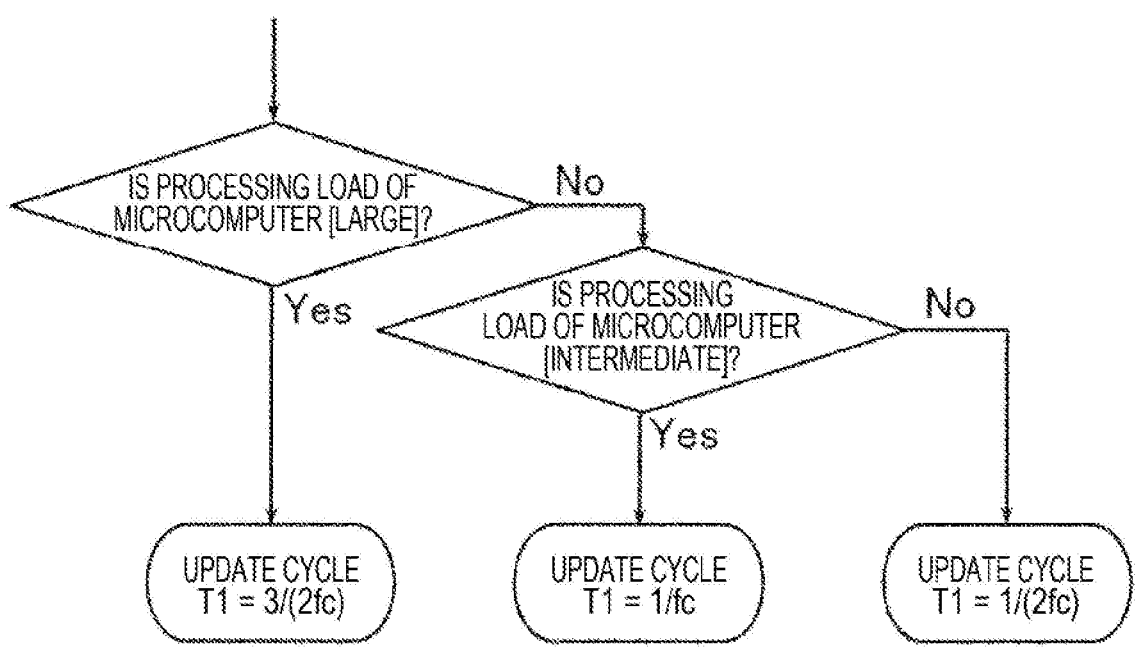
FIG. 6 is a voltage update timing generation flow in the first embodiment.

The voltage update timing generation unit 131 determines voltage update timing according to a calculation load of a microcomputer. FIG. 6 is a voltage update timing generation flow in the first embodiment.

The voltage update timing generation unit 131 changes an update cycle T1 according to a processing load factor of the microcomputer on the basis of the voltage update timing generation flow in FIG. 6. A processing load factor of the microcomputer varies according to the calculation load. For example, a case of using rectangular wave control or torque pulsation suppression control for improving a voltage utilization factor is dealt with. A frequency of a carrier signal is fc. In this case, since current estimation calculation or control in which 6-times pulsation is superimposed on dq-axis currents is performed, a calculation amount is increased as compared with normal current control. In such a case, by extending the update cycle T1 from 1/(2fc) used in the normal current control to 1/(fc) or 3/(2fc), calculation time necessary for the rectangular wave control or the torque pulsation suppression control can be secured.

Figure 7:
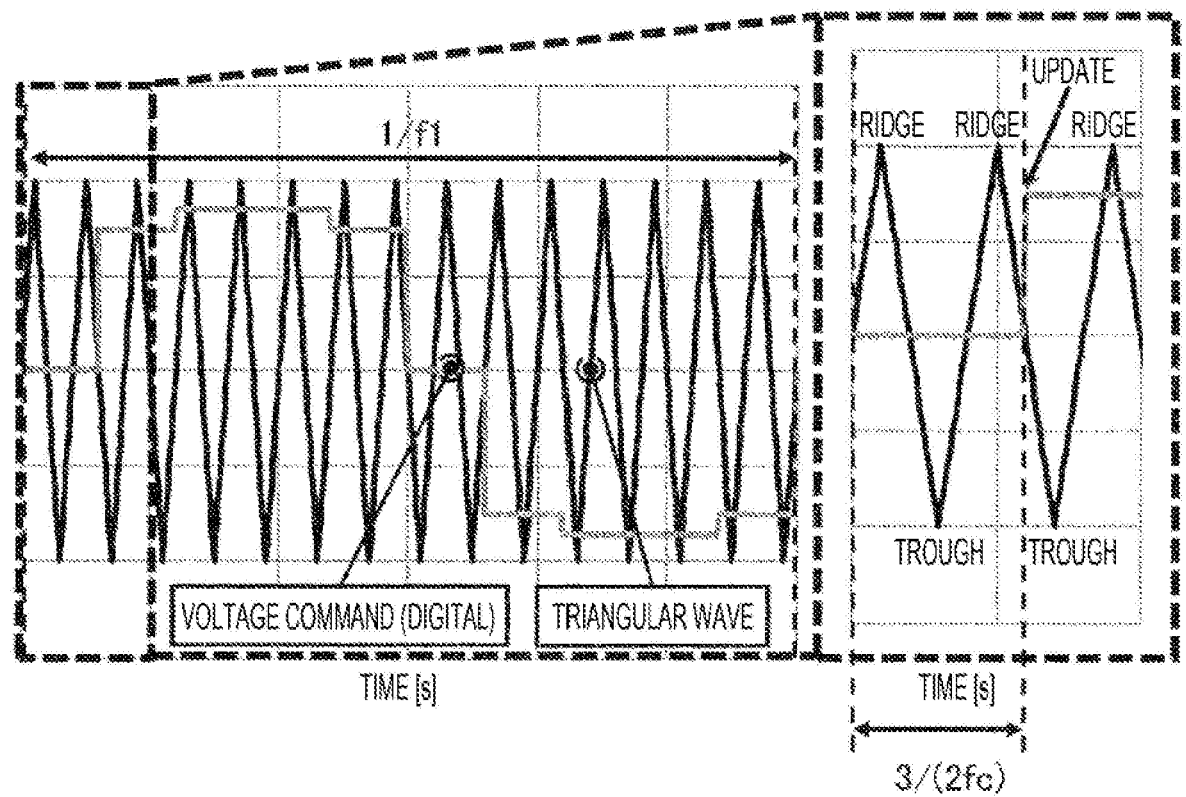
FIG. 7 illustrates voltage update timing of when an update cycle T1 is 3/(2fc).
Figure 8:
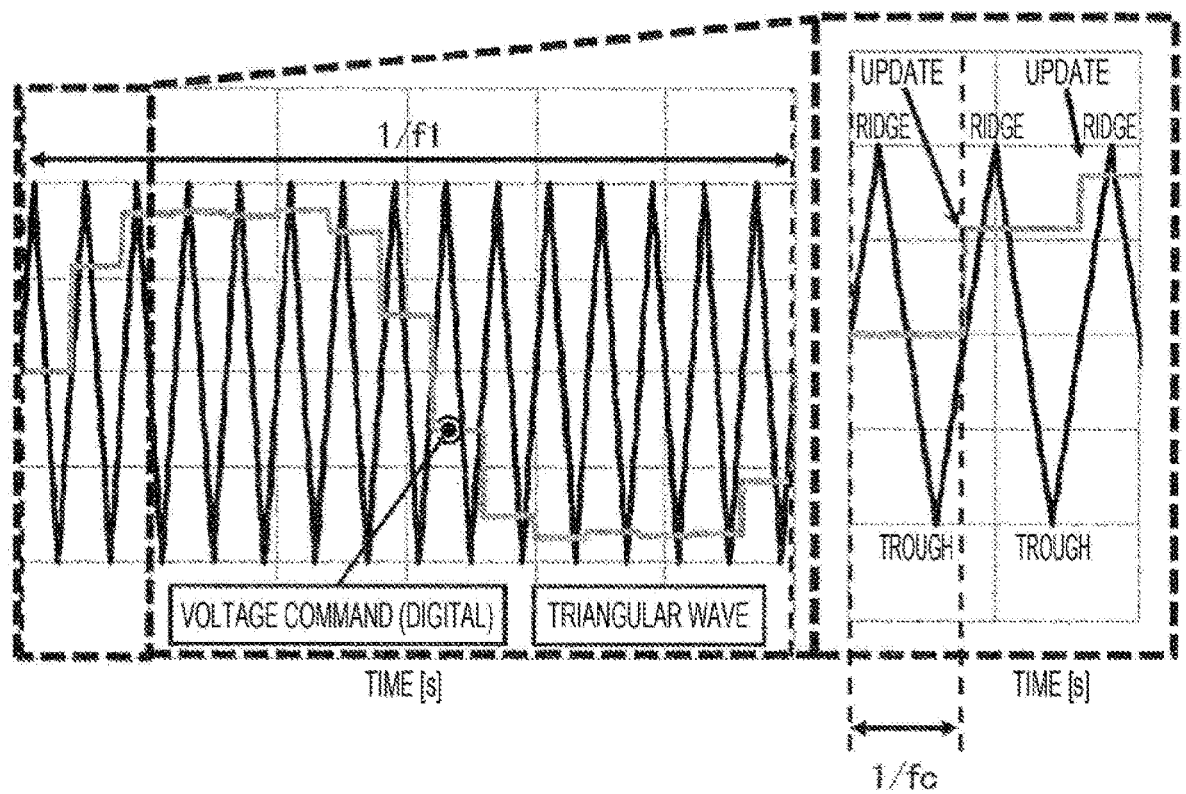
FIG. 8 illustrates voltage update timing of when the update cycle T1 is 1/fc.
Figure 9:
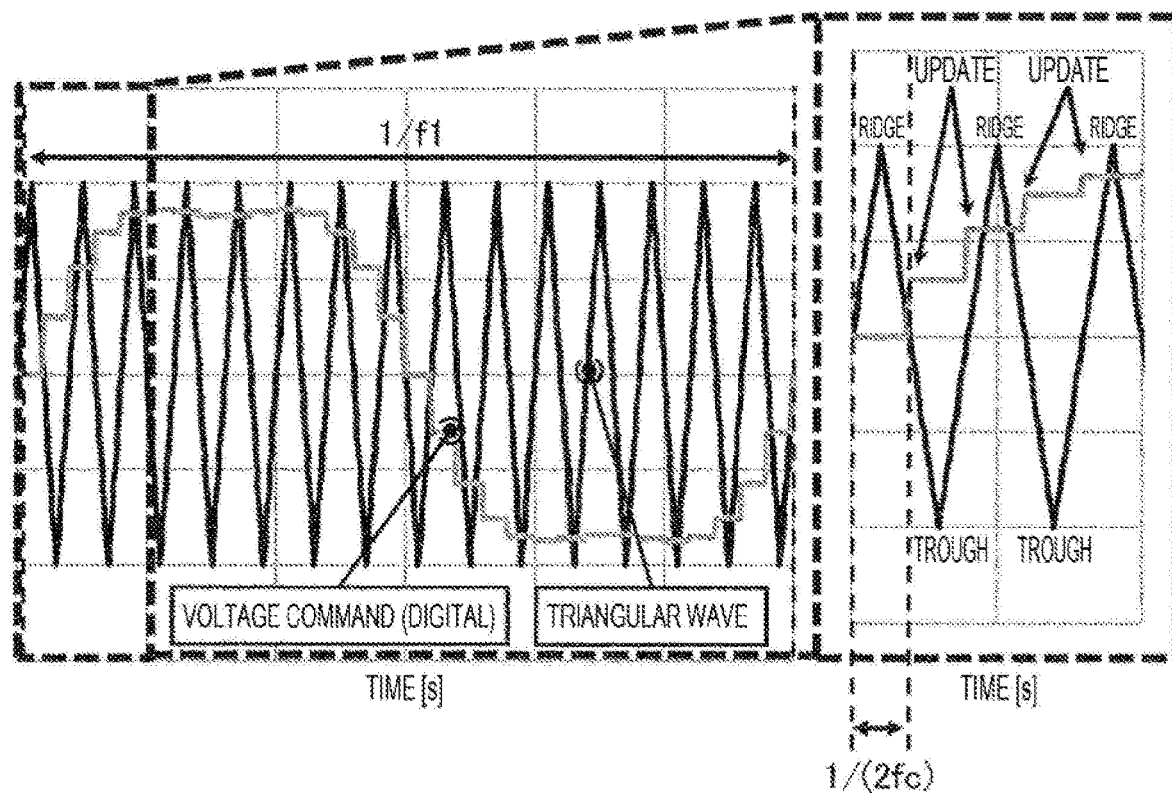
FIG. 9 illustrates voltage update timing of when the update cycle T1 is 1/(2fc).

FIGS. 7 to 9 illustrate the voltage update timings in the update cycle T1. In FIGS. 7 to 9, a ratio between f1 and fc is 15 when a motor electrical angular frequency is f1 and the frequency of the carrier signal is fc.

FIG. 7 illustrates the voltage update timing of when the update cycle T1 is 3/(2fc). In FIG. 7, the voltage update timing is 3/2 times the one cycle (1/fc) of the carrier signal, and "ridge side/trough side/ridge side" and "trough side/ridge side/trough side" of the carrier signal that is a triangular wave alternately appear.

FIG. 8 illustrates the voltage update timing of when the update cycle T1 is 1/fc. In FIG. 8, the voltage update timing is one time the one cycle (1/fc) of the carrier signal, and "ridge side/trough side" of the carrier signal that is a triangular wave continuously appears. Hereinafter, the above voltage update timing is abbreviated as update timing of "ridge".

FIG. 9 illustrates the voltage update timing of when the update cycle T1 is 1/(2fc). In FIG. 9, the voltage update timing is ½ times the one cycle (1/fc) of the carrier signal, and "ridge side" and "trough side" of the carrier signal that is a triangular wave alternately appear. Hereinafter, the above voltage update timing is abbreviated as update timing of "ridge-trough".

The dq/three-phase voltage conversion unit 132 performs fixed coordinate conversion and two-phase three-phase conversion from the d-axis voltage command Vd* and the q-axis voltage command Vq* that are the outputs of the current control unit 12, the rotational position 8 that is the output of the rotational position detector 41, and the update cycle T1 that is the output of the voltage update timing generation unit 131 to generate a U-phase voltage command value Vu*, a V-phase voltage command value Vv*, and a W-phase voltage command value Vw*.

The triangular wave generation unit 133 generates a triangular wave of the frequency fc of the carrier signal on the basis of the frequency fc of the carrier signal.

The gate signal generation unit 134 compares the U-phase voltage command value Vu*, the V-phase voltage command value Vv*, and the W-phase voltage command value Vw* that are the outputs of the dq/three-phase voltage conversion unit 132 with the triangular wave that is the output of the triangular wave generation unit 133 to generate a pulsed voltage. At that time, gate signals Gup, Gvp, and Gwp of an upper arm are logically inverted to generate lower arm gate signals Gun, Gvn, and Gwn.

By thinning the voltage update timing using the voltage update timing generation flow in the first embodiment illustrated in FIG. 6 in this manner, the dq-axis voltage commands are calculated to the three-phase voltage commands, and the processing load of the microcomputer of the voltage command generation unit 13 to be compared with the triangular wave can be reduced.

Next, a second embodiment of the present invention will be described with reference to the drawings.

Figure 10:
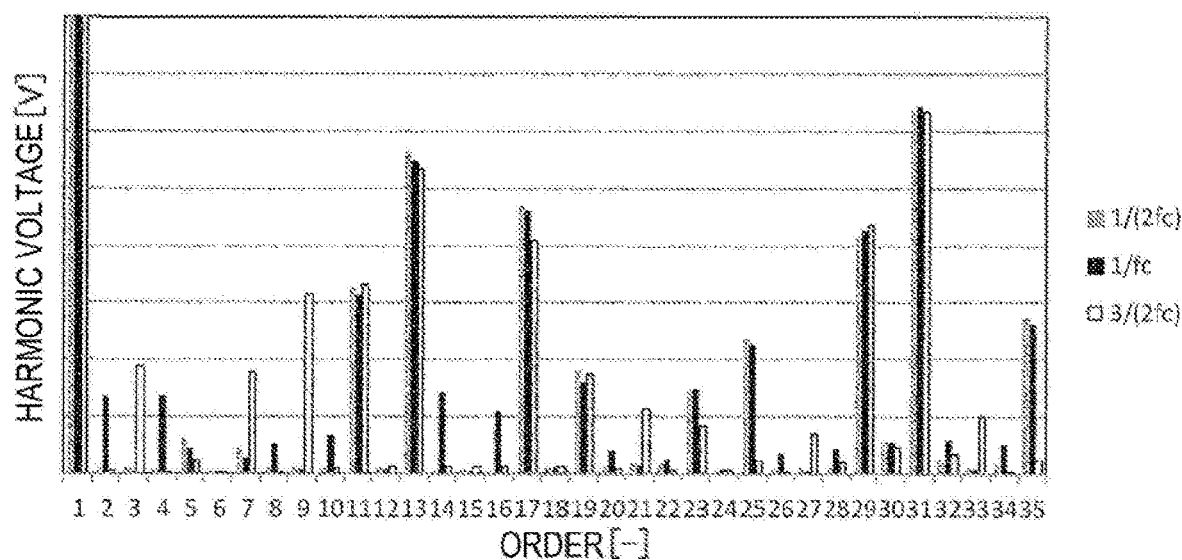
FIG. 10 is a graph illustrating harmonic components of a voltage caused by a difference in voltage update timing of when a ratio of f1 and fc is 15, where a motor electrical angular frequency is f1 and a frequency of a carrier signal is fc.

FIG. 10 is a graph illustrating harmonic components of a voltage caused by a difference in voltage update timing illustrated in FIGS. 7 to 9 of when a ratio of f1 and fc is 15, where a motor electrical angular frequency is f1 and a frequency of a carrier signal is fc.

At any voltage update timing, frequencies fc±2f1 (13th order component and 17th order component in FIG. 10), fc±4f1 (11th order component and 19th order component in FIG. 10), and 2fc±f1 (29th order component and 31st order component in FIG. 10) occur.

Interference occurs between a rotating magnetic field of a stator and a magnetic field of a rotor due to the harmonic components of the voltage, resulting in occurrence of electromagnetic noise of frequencies fc±3f1 and 2fc.

Figure 11:
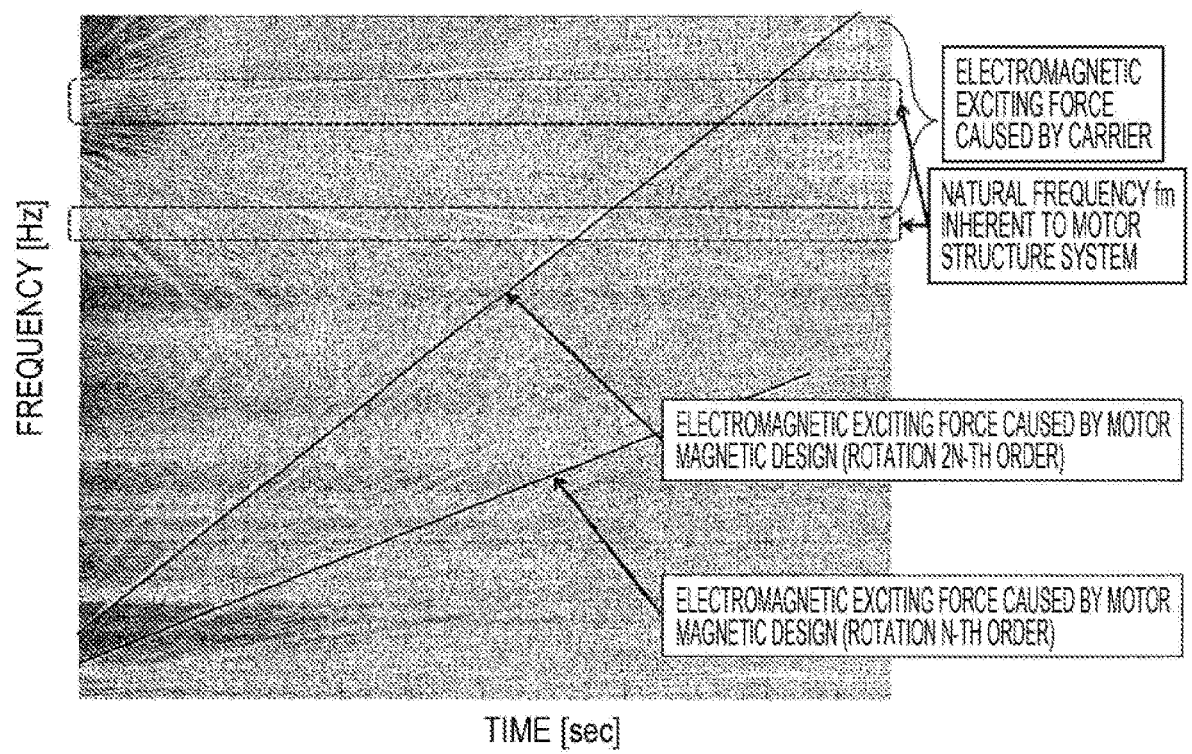
FIG. 11 is a graph of a measurement result of noise of a motor 2 driven by the inverter drive device.

The above-described frequencies will be described in detail using actually measured electromagnetic noise of the motor as an example. FIG. 11 is a graph of a measurement result of noise of the motor 2 driven by the inverter drive device. The voltage update timing T1 of the voltage update timing generation unit 131 in this inverter drive device is (1/fc). At this time, the harmonic voltage output from the inverter 31 of the motor drive apparatus 6 is the harmonic voltage of when the voltage update timing T1 in FIG. 10 is (1/fc). When the voltage update timing T1 is (1/fc), the harmonic voltage of a frequency fc±f1 (14th order component and 16th order component in FIG. 10) occurs in addition to the harmonic voltages of the frequencies fc±2f1 (13th order component and 17th order component in FIG. 10), fc±4f1 (11th order component and 19th order component in FIG. 10), and 2fc±f1 (29th order component and 31st order component in FIG. 10).

When the harmonic voltage is applied to the motor, the current becomes a harmonic current having the same frequency as the voltage. Interfere occurs between the rotating magnetic field of the stator and the magnetic field of the rotor due to the frequencies fc±2f1 (13th order component and 17th order component in FIG. 10) and fc±4f1 (11th order component and 19th order component of FIG. 10), resulting in occurrence of electromagnetic force of the frequency fc±3f1. Similarly, electromagnetic force of the frequencies fc±3f1 and 2fc occurs. This electromagnetic force vibrates a motor case and a housing, resulting in the electromagnetic noise.

Meanwhile, when the voltage update timing T1 in FIG. 10 is (½fc), the harmonic voltage of the frequency fc±f1 (14th order component and 16th order component in FIG. 10) does not occur. Therefore, frequencies of the electromagnetic force generated by the harmonic voltage are frequencies fc±3f1 and 2fc. Further, when the voltage update timing T1 in FIG. 10 is (3/2fc), the harmonic voltage of the frequency fc±f1 (14th order component and 16th order component in FIG. 10) does not occur and the harmonic voltage of frequencies (2fc)/3±f1 and (2fc)/3±f1 occur. Therefore, electromagnetic noise of a frequency (2fc)/3±2f1 generated by the harmonic voltage occurs.

When a rotation speed of the motor changes, the motor electrical angular frequency f1 changes accordingly. The frequency fc±3f1 of the electromagnetic noise that changes according to the rotation speed of the motor, a natural frequency fm of a case housing (mechanism) of the motor 2, and a frequency caused by electromagnetic exciting force generated in proportion to the rotational speed inherent to the magnetic design of the motor 2 resonate, so that the noise becomes large. As an example, in the measurement result of the electromagnetic noise of the motor 2 in FIG. 11, the noise of the frequency fc−3f1 caused by the voltage harmonic of the inverter 3 coincides with the natural frequency fm of the motor structure system, and the noise becomes large due to the resonance.

Next, the noise due to the magnetic design of the motor will be described. The noise due to the magnetic design of the motor occurs depending on the number of poles of the rotor and the number of slots of the stator of the motor, a magnetic gap, a winding method of the stator, and the like, and generally occurs at N times the motor electrical angular frequency f1. For example, in the measurement result of the motor in FIG. 11, large noise occurs in the motor 2 at 12 times and 24 times the electrical angular frequency f1.

FIG. 12 illustrates a table of frequencies of the electromagnetic noise generated by the motor 2 and the inverter 3. When the electromagnetic force generated at these frequencies coincides with the natural frequency (fm1, fm2, fm3, or the like) of the case housing, vibration and noise due to the electromagnetic force become large.

In the second embodiment of the present invention, voltage command update timing and a frequency of a carrier signal are changed to avoid the resonance to minimize the electromagnetic noise, unlike the actually measured electromagnetic noise illustrated in FIG. 11.

Figure 13:
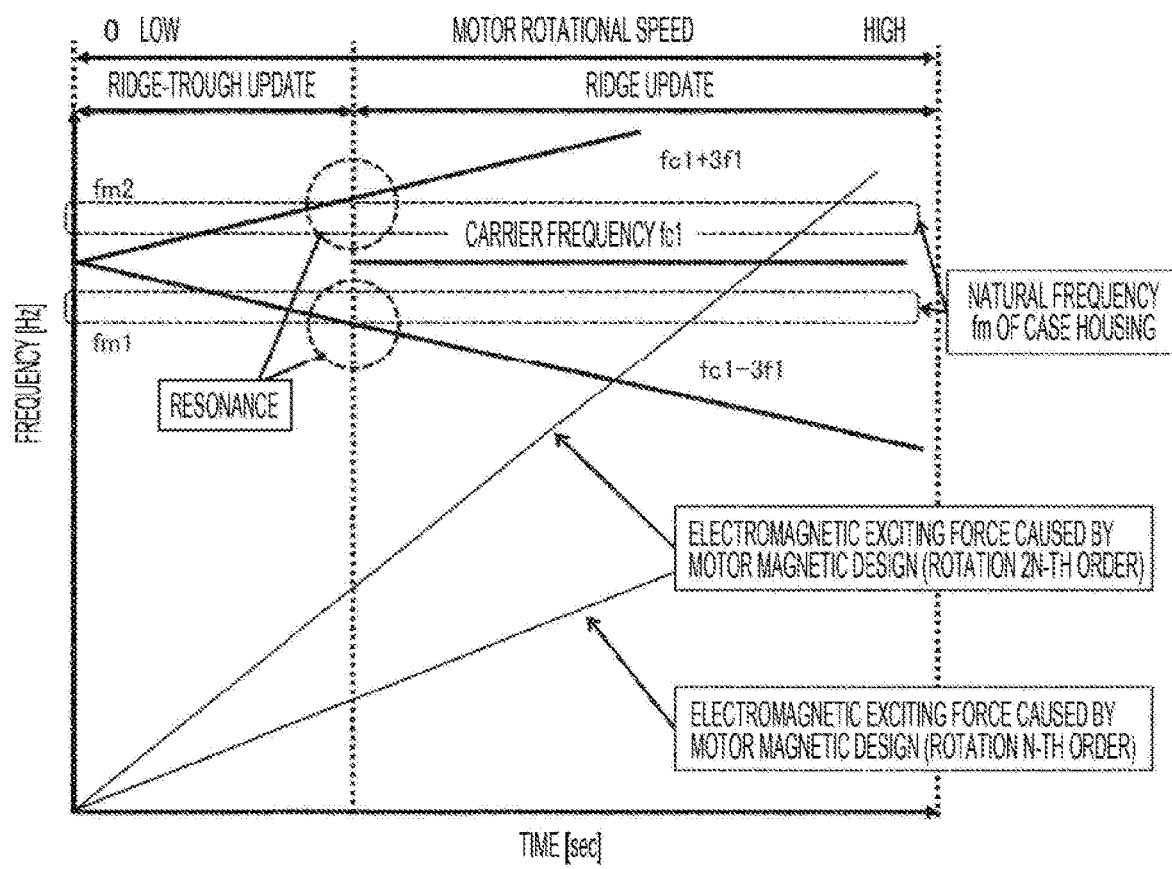
FIG. 13 is a graph illustrating a relationship between a frequency of a carrier signal and noise in a second embodiment.

Generally, a calculation load of a microcomputer increases as the voltage command update timing is set to ridge-trough update while increasing the frequency of the carrier signal. Therefore, in a case of increasing the frequency of the carrier signal, the voltage command update timing needs to be set to ridge update. In a case of using the same carrier frequency when switching the ridge-trough update and the ridge update, the carrier frequency coincides with natural frequencies fm1 and fm2 of the case housing as illustrated in FIG. 13, and the carrier electromagnetic noise becomes large.

Figure 14:
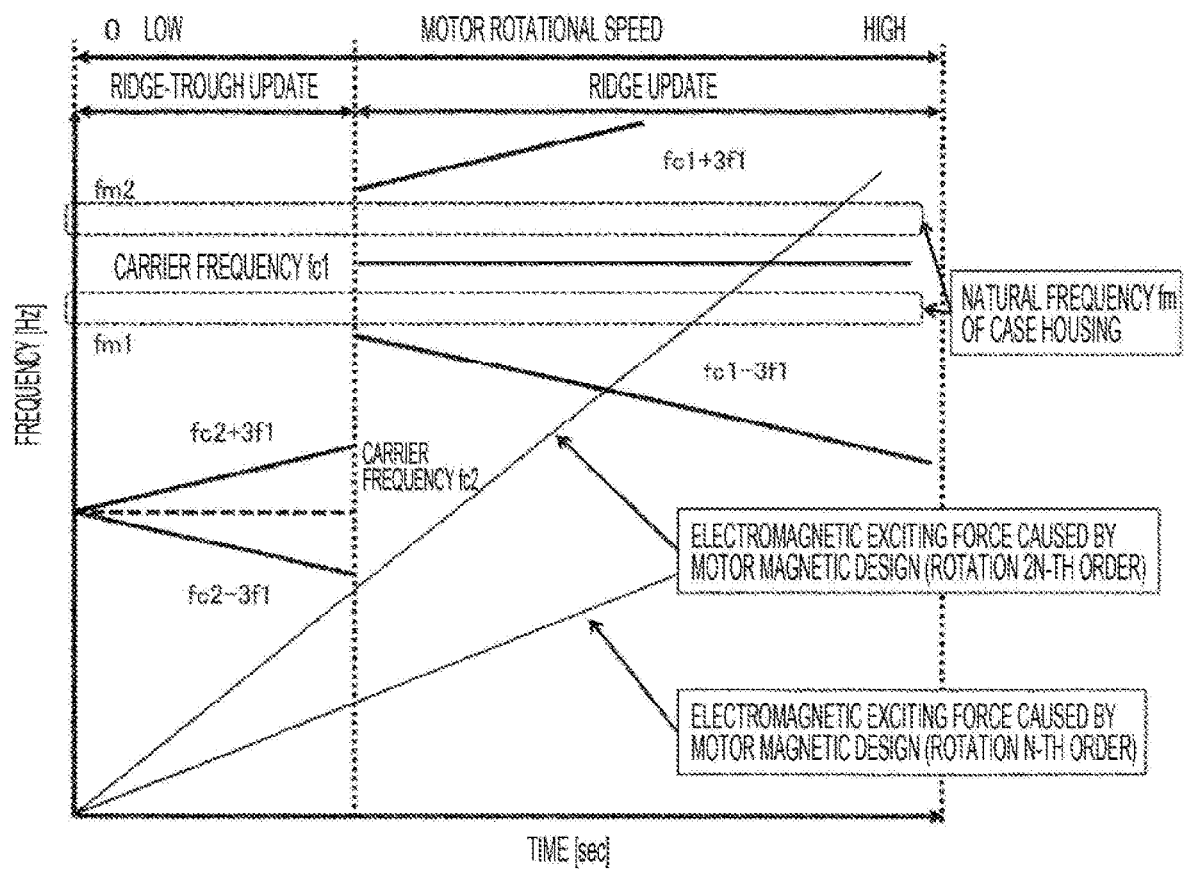
FIG. 14 illustrates an example of a method of changing a carrier frequency and voltage update timing according to the second embodiment of the present invention.

FIG. 14 illustrates an example of a method of changing the carrier frequency and the voltage update timing according to the second embodiment of the present invention. In the second embodiment of the present invention, two carrier frequencies: a first carrier frequency fc1 and a second carrier frequency fc2 are provided. When the rotation speed of the motor is low, the carrier frequency is set to the carrier frequency rather than to the natural frequencies fm1 and fm2 of the case housing. When the processing load of the microcomputer becomes high and the voltage update timing is set to the ridge update, the carrier frequency fc1 is set to between the natural frequencies fm1 and fm2 of the case housing so as not to coincide with the frequency fc±3f1 of the electromagnetic noise that radially spreads. With the setting, the resonance with the case housing is avoided, and the electromagnetic noise occurring in the motor drive system 6 can be reduced.

Further, when the rotation speed of the motor is low, the frequency fc2 of the carrier electromagnetic noise occurring as the voltage update timing is set to T1 may be caused to coincide with the natural frequency fm1 or fm2 of the case housing to generate sound with a small harmonic voltage.

Next, another embodiment in which the inverter drive device according to the present invention is applied to a vehicle will be described with reference to FIG. 15.

Figure 15:
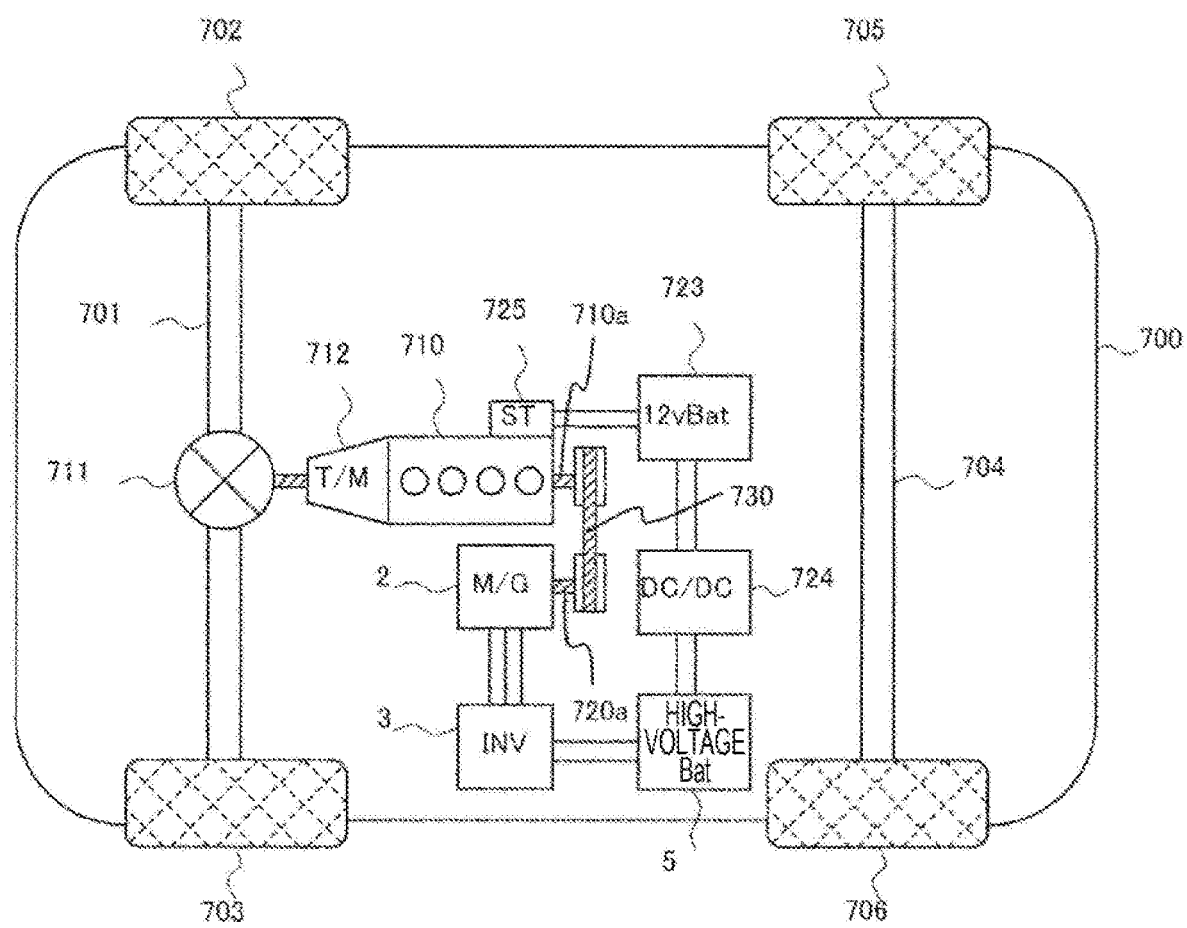
FIG. 15 is a configuration diagram of a hybrid automobile system to which an inverter drive device of the present embodiment is applied.

FIG. 15 is a configuration diagram of a hybrid automobile system to which the inverter drive device of the present embodiment is applied. As illustrated in FIG. 15, the hybrid automobile system includes a power train in which the motor 2 is applied as a motor/generator.

In the automobile illustrated in FIG. 15, the reference numeral 700 represents a vehicle body. A front wheel axle 701 is rotatably supported on a front portion of the vehicle body 700, and front wheels 702 and 703 are provided at both ends of the front wheel axle 701. A rear wheel axle 704 is rotatably supported on a rear portion of the vehicle body 700, and rear wheels 705 and 706 are provided at both ends of the rear wheel axle 704.

A differential gear 711 that is a power distribution mechanism is provided in a central portion of the front wheel axle 701 and distributes rotational driving force transmitted from an engine 710 via a transmission 712 to the right and left front wheel axles 701.

A pulley 710a provided on a crankshaft of the engine 710 and a pulley 720a provided on a rotation shaft of the motor 2 are mechanically coupled via a belt 730 between the engine 710 and the motor 2.

As a result, the rotational driving force of the motor 2 can be transmitted to the engine 710, and the rotational driving force of the engine 710 can be transmitted to the motor 2. In the motor 2, the rotor rotates as three-phase alternating current power controlled by the inverter 3 is supplied to a stator coil of the stator, and the rotational driving force according to the three-phase alternating current power is generated.

That is, the motor 2 operates as an electric motor under the control of the inverter 3 while operating as a generator that generates the three-phase alternating current power when electromotive force is induced in the stator coil of the stator as the rotor rotates by receiving the rotational driving force of the engine 710.

The inverter 3 is a power conversion device that converts the direct current power supplied from the high-voltage battery 5, which is a high-voltage (42 V or 300 V) system power supply, into the three-phase alternating current power, and controls the three-phase alternating current flowing in the stator coil of the motor 2 according to a magnetic pole position of the rotor according to an operation command value.

The three-phase alternating current power generated by the motor 2 is converted into the direct current power by the inverter 3 to charge the high-voltage battery 5. The high-voltage battery 5 is electrically connected to a low-voltage battery 723 via a DC-DC converter 724. The low-voltage battery 723 constitutes a low-voltage (14 V) power supply of the automobile, and is used as a power supply for a starter 725 for initial start (cold start) of the engine 710, a radio, light, and the like.

When the engine 710 is stopped when the vehicle is stopped (idle stop mode) such as waiting for a traffic light, and when the engine 710 is restarted (hot start) at the time of re-departure, the inverter 3 drives the motor 2 to rotate the engine 710. Note that, in a case where a charge amount of the high-voltage battery 5 is insufficient or a case where the engine 710 is not sufficiently warmed in the idle stop mode, the engine 710 is not stopped and the driving is continued. Further, during the idle stop mode, a drive source for auxiliary machinery that uses the engine 710 as a driving source, such as an air conditioner compressor, needs to be secured. In this case, the auxiliary machine is driven by driving the motor 2.

Even in an acceleration mode or a high-load operation mode, the motor 2 is driven to assist driving of the engine 710. Conversely, in a charging mode where the high-voltage battery 5 requires charging, the engine 710 causes the motor 2 to generate power to charge the high-voltage battery 5. That is, a regeneration mode at the time of braking or deceleration of the vehicle is performed.

The electrically driven vehicle using the inverter drive device of the present embodiment reduces the electromagnetic noise while reducing the calculation load of the microcomputer, thereby reducing vibration-proof material, soundproof material, and sound insulation material to be affixed to the vehicle body. Further, fuel economy can be improved by reducing these materials.

In the above-described embodiments, the case in which the motor drive apparatus 6 of the present embodiment is applied to the hybrid automobile system has been described. However, similar effects can be obtained in electric automobiles.

Further, in the above-described embodiment, the single inverter device has been described. However, it goes without saying that the present invention can also be applied to a motor drive system in which an inverter unit and a motor are integrated as long as the system has the above-described functions.

Note that the present invention is not limited to the above-described embodiments, and various modifications can be made without departing from the spirit of the present invention.

REFERENCE SIGNS LIST 1 control unit
2 motor
3 inverter
4 rotational position sensor
5 high-voltage battery
6 motor drive apparatus
7 current detection means 11 three-phase/dq conversion current control unit
12 current control unit
13 voltage command generation unit
31 inverter circuit
32 pulse width modulation signal output means
33 smoothing capacitor
41 rotational position detector
131 voltage update timing generation unit
132 dq/three-phase voltage command conversion unit
133 triangular wave generation unit
134 gate signal generation unit
700 vehicle body
701 front wheel axle
702 front wheel
703 front wheel
704 rear wheel axle
705 rear wheel
706 rear wheel
710 engine
710a pulley
711 differential gear
712 transmission
720a pulley
723 low-voltage battery
724 DC-DC converter
725 starter
730 belt
f1 motor electrical angular frequency
fc frequency of carrier signal
Gup U-phase gate signal of upper arm
Gvp V-phase gate signal of upper arm
Gwp W-phase gate signal of upper arm
Gun U-phase gate signal of lower arm
Gvn V-phase gate signal of lower arm
Gwn W-phase gate signal of lower arm
Id d-axis current value
Idc current detection value
Id* d-axis current command
Iq q-axis current value
Iq* q-axis current command
Iu U-phase alternating current
Iv V-phase alternating current
Iw W-phase alternating current
T1 update cycle
Rsh shunt resistor
VB direct current voltage
Vd* d-axis voltage command
Vq* q-axis voltage command
Vu* U-phase voltage command value
Vv* V-phase voltage command value
Vw* W-phase voltage command value
θ rotational position
ωr motor rotational speed

The invention claimed is:

1. An apparatus comprising:
a microcomputer;
an inverter drive device configured to switch a first control mode, a second control mode, and a third control mode on the basis of vehicle speed information in a motor control device that controls a power converter that drives a polyphase motor by a PWM pulse signal based on a carrier signal; and
a voltage timing generator, wherein
the first control mode is configured to update a command voltage signal to the power converter only on a ridge side or a trough side of the carrier signal,
the second control mode is configured to update a command voltage signal to the power converter both on a ridge side and a trough side of the carrier signal,
the third control mode is configured to update a command voltage signal to the power converter only once of ridge-trough-ridge or trough-ridge-trough of the carrier signal, and
the voltage timing generator changes an update cycle according to a processing load factor of the microcomputer on the basis of a flow of the voltage timing generator.

2. The apparatus according to claim 1, wherein
the inverter drive device changes a frequency of the carrier signal and the three control modes so that a frequency of electromagnetic noise that occurs due to the PWM pulse signal of the power converter, the PWM signal occurring in the three control modes, does not coincide with a resonance frequency of the polyphase motor.

3. The apparatus according to claim 1, wherein
the inverter drive device changes a frequency of the carrier signal and the three control modes so that a frequency of electromagnetic noise that occurs due to the PWM pulse signal of the power converter, the PWM signal occurring in the three control modes, does not coincide with a frequency of noise caused by electromagnetic exciting force of the other phase motor.

4. An electrically driven vehicle system comprising:
the apparatus according to claim 1; and
a three-phase motor driven and controlled by the inverter drive device.

* * * * *